(12) United States Patent
Takihara et al.

(10) Patent No.: US 8,703,839 B2
(45) Date of Patent: Apr. 22, 2014

(54) ACTIVE ENERGY RAY-CURABLE RESIN COMPOSITION, NANO RIDGE/GROOVE STRUCTURE USING SAME AND PRODUCTION METHOD FOR SAID STRUCTURE, AND WATER REPELLENT ARTICLE PROVIDED WITH NANO RIDGE/GROOVE STRUCTURE

(75) Inventors: Tsuyoshi Takihara, Hiroshima (JP); Hiroshi Onomoto, Hiroshima (JP); Eiko Okamoto, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/639,542

(22) PCT Filed: Apr. 4, 2011

(86) PCT No.: PCT/JP2011/058506
§ 371 (c)(1),
(2), (4) Date: Nov. 20, 2012

(87) PCT Pub. No.: WO2011/125970
PCT Pub. Date: Oct. 13, 2011

(65) Prior Publication Data
US 2013/0210957 A1  Aug. 15, 2013

(30) Foreign Application Priority Data
Apr. 5, 2010 (JP) .................................. 2010-086926

(51) Int. Cl.
| C08F 20/22 | (2006.01) |
| B29D 11/00 | (2006.01) |
| C08F 2/46  | (2006.01) |
| C08G 61/04 | (2006.01) |

(52) U.S. Cl.
USPC .................... 522/182; 522/178; 522/1; 520/1

(58) Field of Classification Search
USPC .................................. 522/182, 178, 1; 520/1
See application file for complete search history.

(56) References Cited

U.S. PATENT DOCUMENTS

| 2008/0076877 A1* | 3/2008 | Mano et al. .................. 525/101 |
| 2011/0230623 A1 | 9/2011 | Hirano et al. |
| 2013/0053506 A1 | 2/2013 | Ohtaguro et al. |

FOREIGN PATENT DOCUMENTS

| JP | 64-065112    | * | 3/1989  |
| JP | 3-111409     |   | 5/1991  |
| JP | 4-102240     |   | 4/1992  |
| JP | 8-239430     |   | 9/1996  |
| JP | 2000-301053  |   | 10/2000 |
| JP | 2005-183546  |   | 7/2005  |
| JP | 2007-196383  |   | 8/2007  |
| JP | 2009-7567    |   | 1/2009  |
| JP | 2009-114248  |   | 5/2009  |
| JP | 2009-167354  |   | 7/2009  |
| JP | 2009-249558  |   | 10/2009 |
| JP | 2010-17936   |   | 1/2010  |
| JP | 2010-116562  |   | 5/2010  |
| JP | 2011-74232   |   | 4/2011  |
| TW | 201012647 A  |   | 4/2010  |
| TW | 201012847 A  |   | 4/2010  |

OTHER PUBLICATIONS

Office Action issued in related Taiwanese Application No. 100111550 dated May 29, 2013.

\* cited by examiner

*Primary Examiner* — Ling Choi
*Assistant Examiner* — Jessica E Whiteley
(74) *Attorney, Agent, or Firm* — Morgan, Lewis & Bockius LLP

(57) ABSTRACT

Disclosed is an activation energy ray-curable resin composition comprising 70 to 95 parts by mass of a multifunctional monomer (A) which has a surface free energy of 37 mJ/m$^2$ or more when cured and 5 to 30 parts by mass of a fluorine (meth)acrylate (B) which is compatible with the multifunctional monomer (A) (a total content of all monomers in the composition shall be 100 parts by mass), wherein the multifunctional monomer (A) has three or more radical polymerizable functional groups in a molecule and a value of a molecular weight thereof divided by the number of the radical polymerizable functional group (molecular weight/number of radical polymerizable functional group) is 110 to 200, and wherein the fluorine (meth)acrylate (B) has one or more radical polymerizable functional groups in a molecule.

14 Claims, 1 Drawing Sheet

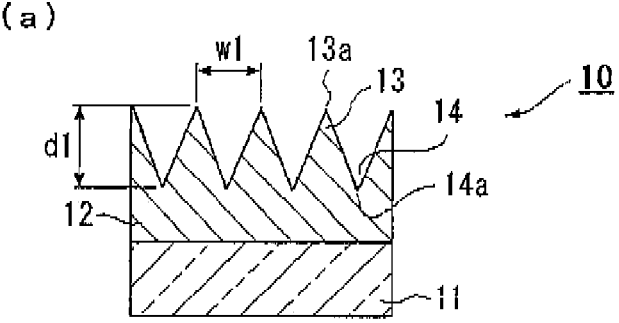
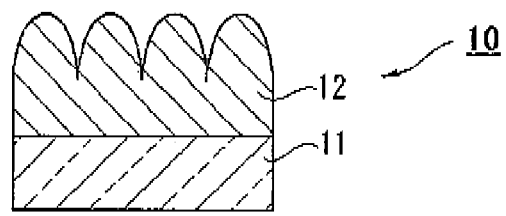

ACTIVE ENERGY RAY-CURABLE RESIN COMPOSITION, NANO RIDGE/GROOVE STRUCTURE USING SAME AND PRODUCTION METHOD FOR SAID STRUCTURE, AND WATER REPELLENT ARTICLE PROVIDED WITH NANO RIDGE/GROOVE STRUCTURE

TECHNICAL FIELD

The present invention relates to an activation energy ray-curable resin composition which can provide a nano concave-convex structure body or the like with a high abrasion resistance and a good water repellency, and a nano concave-convex structure body using the same and a production method thereof, and a water-repellent article having a nano concave-convex structure body.

BACKGROUND ART

It is known that nano concave-convex structure bodies having a nano concave-convex structure body on the surface develops an antireflection performance by the continuous change of the refraction index. Also, the nano concave-convex structure body can develop a super water-repellent performance by Lotus effect.

As an example of the method for forming a nano concave-convex structure, proposed are, for example, a method which contains injection molding or press molding using a stamper having an inversion structure of a nano concave-convex structure, a method which contains providing an activation energy ray-curable resin composition (hereinafter, referred to as resin composition") between a stamper and a substrate, curing the resin composition by irradiation of an activation energy ray to transfer the concave-convex structure of the stamper, and thereafter detaching the stamper, a method which contains detaching the stamper after transferring the concave-convex structure of the stamper, and thereafter curing the resin composition by irradiation of an activation energy ray, and the like.

Among these, with consideration for the transcription property of the nano concave-convex structure and the flexibility of the surface composition, the method which contains curing the resin composition by irradiation of an activation energy ray to transfer the nano concave-convex structure is suitable. This method is particularly suitable in the case of using a belt or roll stamper by which the continuous production can be conducted, and is an excellent method in productivity. However, in the case of this method, it is necessary to adjust the viscosity of the resin composition to transfer the nanosize concave-convex structure. Also, if the strength of the cured material of the resin composition is too high, it may be difficult to detach the stamper. Thus, since it is necessary to adjust the viscosity of the resin composition and the strength of the cured material, the usable resin composition is limited.

Also, the nano concave-convex structure body has an abrasion resistance inferior to that of a molded body such as a hard coat produced by using the same resin composition which has a flat surface, and there is a problem in durability during use.

Conventionally, a nano concave-convex structure body obtained by the method which contains curing the resin composition by irradiation of an activation energy ray to transfer the nano concave-convex structure and a resin composition for forming a nano concave-convex structure are proposed. Also, there is known a method for easily developing water-repellency by compounding a water-repellent component such as a fluorine compound or a silicone compound to a resin composition. In particular, a fluorine compound can be used to make the surface free energy extremely low. Further, a fluorine compound can develop an oil-repellency that cannot be developed in a silicone system.

For example, Patent document 1 discloses a cured coating with an excellent abrasion resistance and antifouling property by using a fluorine monomer component having a specific structure. Also, Patent document 2 discloses a curable composition containing a fluorine-containing polymer. Also, Patent document 3 discloses a polymer containing both silicon and fluorine which can give an antifouling property and a slipping property. Also, Patent document 4 discloses a post processing treatment by applying a fluorine compound on the surface of nano concave-convex structure body, and it is coupled by silane coupling reaction or the like.

PRIOR ART DOCUMENT

Patent Document

Patent document 1: JP 2009-114248 A
Patent document 2: JP 2009-167354 A
Patent document 3: JP 2009-249558 A
Patent document 4: JP 2007-196383 A

SUMMARY OF THE INVENTION

Problem to be Solved by the Invention

However, Patent document 1 discloses that when 2 parts by mass or more of a fluorine monomer is added, the transparency is deteriorated. Also, an organic solvent is required to make the fluorine monomer and the multifunctional monomer uniformly compatible. In this case, there is not so big problem for production if it is a process of application of a coating solution, and of thereafter polymerization and curing by irradiation of an activation energy ray through a drying step. However, if it is a process of polymerization and curing by irradiation of an activation energy ray in a state in which it is poured and of detaching it thereafter, the solvent remains in the cured material to result in the lowering of the molded article.

Patent document 2 also discloses as a problem that the fluorine-containing polymer is difficult to be compatible with the multifunctional monomer. To solve the problem, the structure of the multifunctional monomer is specified. Also, in both Patent document 2 and Patent document 3, a solvent is appropriately used to be compatible with the multifunctional monomer. In this case, there remains a problem if the polymerization and curing process is not through a drying step. Also, these oligomers and polymers have a polymerizable group, but there is a limitation to raise the cross-linked density high and the satisfied hardness cannot be obtained for particularly using it as a nano concave-convex structure body.

Further, the inventions described above aim at transferring a fluorine-containing antifouling component to the outer layer in the process of volatilizing the solvent. Thus, it is impossible to give a comparable water-repellency or oil-repellency by the molding method of polymerization and curing by irradiation of an activation energy ray in a state in which it is poured and of detaching it thereafter.

Thus, although there are proposed a lot of fluorine-containing curable compositions to provide an antifouling property, as a resin composition for forming a nano concave-convex structure, the abrasion resistance is not sufficiently satisfied. Also, it is impossible to give a water-repellency or an oil-repellency to the surface by a polymerization and curing in the mold.

On the other hand, according to the post processing treatment disclosed in Patent document 4, a certain abrasion resistance can be given to the nano concave-convex structure body, but there is a problem that the detachment or slipping of the outer layer occur and that the production cost is increased.

The present invention was performed in view of each circumstance explained above. That is, the object of the present invention is to an activation energy ray-curable resin composition which can provide a nano concave-convex structure body or the like with a high abrasion resistance and a good water repellency, and a nano concave-convex structure body using the same and a production method thereof, and a water-repellent article having a nano concave-convex structure body.

Means of Solving the Problem

As a result of the present inventors' earnest study, it has been focused that the water-repellency or the oil-repellency can easily be developed with lowering the surface free energy of the solid. Examples of the compound with a low surface energy include fluorine compounds and silicone compounds. However, although the resin composition containing a large amount of this compound is excellent water-repellent or oil-repellent, the glass-transition temperature thereof is low, and it often becomes soft. Therefore, it is difficult to balance a mechanical property such as an abrasion resistance and a surface property such as a water-repellency or an antifouling property only by using the compound with a low surface energy. In order to balance these, there is a method of separately conducting a surface treatment to the cured material obtained, but it results in the detachment or slipping of the outer layer as well as the increase of production cost.

Thus, as a result of the present inventors' further study, it has been found that, when a monomer with a high surface free energy is used as a main component and a monomer with a low surface energy is used together, the phase separation occurs with the curing of the resin composition and the monomer with a low surface energy is eccentrically located on the surface of the cured material. As a result, the cured material obtained develops a mechanical property such as an abrasion resistance by the monomer with a high surface energy that is a main component and also develops a surface property such as a water-repellent by the monomer with a low surface energy which is eccentrically located on the surface of the cured material. And, the present inventors have achieved the present invention based on this knowledge.

That is, the present invention is an activation energy ray-curable resin composition comprising 70 to 95 parts by mass of a multifunctional monomer (A) which has a surface free energy of 37 $mJ/m^2$ or more when cured and 5 to 30 parts by mass of a fluorine (meth)acrylate (B) which is compatible with the multifunctional monomer (A)

(a total content of all monomers in the composition shall be 100 parts by mass), wherein the multifunctional monomer (A) has three or more radical polymerizable functional groups in the molecule, and a value of the molecular weight divided by the number of the radical polymerizable functional group (Molecular weight/Number of radical polymerizable functional group) is in 110 to 200, and the fluorine (meth)acrylate (B) has one or more radical polymerizable functional groups in a molecule.

Also, the present invention is a water-repellent article obtained by polymerizing and curing the above-mentioned activation energy ray-curable resin composition, and is further a nano concave-convex structure body having a nano concave-convex surface obtained by polymerizing and curing the above-mentioned activation energy ray-curable resin composition, and is further a water-repellent article having the nano concave-convex structure body.

Also, the present invention is a method for producing a nano concave-convex structure body comprising:

providing the activation energy ray-curable resin composition according to claim 1 between a stamper and a substrate which have an inversion structure of a nano concave-convex structure, curing the activation energy ray-curable resin composition by irradiation of an activation energy ray, and detaching the stamper from the cured material to form a nano concave-convex structure consisting of the cured material on the substrate.

Effect of the Invention

When the resin composition of the present invention is cured by irradiation of an activation energy ray, the cured material has a developed surface property such as water-repellent by fluorine (meth)acrylate that is eccentrically located on the surface of the cured material with developing a mechanical property such as abrasion resistance by the multifunctional monomer (A) that is a main component. Thus, the resin composition of the present invention is very useful as an activation energy ray-curable resin composition which can form a nano concave-convex structure body having both a high abrasion resistance and a good water-repellent.

The nano concave-convex structure body of the present invention has the above-mentioned excellent properties with keeping an excellent optical performance as a nano concave-convex structure body. Also, the method for producing a nano concave-convex structure body of the present invention is a method by which the concave-convex structure body having excellent properties can be easily and successfully produced. Further, the water-repellent article having a nano concave-convex structure body of the present invention has a particularly excellent water-repellency with a high mechanical property such as abrasion resistance.

BRIEF DESCRIPTION OF DRAWINGS

FIGS. 1(a) and 1(b) are a schematic cross-sectional view showing an embodiment of the nano concave-convex structure body obtained by the present invention.

MODE FOR CARRYING OUT THE INVENTION

<Activation Energy Ray-Curable Resin Composition>

The activation energy ray-curable resin composition (hereinafter, may simply be expressed as "resin composition") is a curable resin composition whose polymerization reaction progresses by irradiating an activation energy ray. Also, as described above, it contains the multifunctional monomer (A) and the fluorine (meth)acrylate (B) as a curable monomer component. Note that, in the present invention, "(meth)acrylate" means "acrylate and/or methacrylate". As follows, each above-mentioned component and another arbitrary component are explained.

<Curable Monomer Component>

The multifunctional monomer (A) that is a polymerizable monomer component of the present invention is a monomer which has a surface free energy of 37 mJ/m² or more when cured, and the fluorine (meth)acrylate (B) is a monomer which is compatible with the multifunctional monomer (A).

The surface free energy of fluorine (meth)acrylate (B) when cured is lower than the surface free energy of multifunctional monomer (A) when cured. And, in the present invention, by using both monomers together, the fluorine (meth)acrylate (B) with a low surface energy can be eccentrically located on the surface of the cured material by phase separation associated with the curing of the resin composition. The phase separation associated with the curing is induced by the multifunctional monomer (A) with a high surface free energy. In Particular, when the surface free energy of multifunctional monomer (A) is higher, it becomes easier to induce it. However, if the difference of both surface free energies is too large, the both are hardly compatible with each other, and the resin composition may be cloudy and the curing condition may be heterogeneous. Thus, it is important that the both have an appropriate compatibility.

(Multifunctional Monomer (A))

The multifunctional monomer (A) is a main component of the resin composition, and plays a roll to make the good mechanical property (in particular, abrasion resistance) of the cured material maintained and to make the phase separation associated with the curing induced.

The surface free energy of multifunctional monomer (A) when cured is 37 mJ/m² or more, is preferably 37 to 65 mJ/m², is more preferably 40 to 60 mJ/m², and is particularly preferably 43 to 50 mJ/m². When it is 37 mJ/m² or more, the phase separation associated with the curing can effectively be induced. Also, when it is 65 mJ/m² or less, it is effective at the point that the separation and the cloudiness of the resin composition are suppressed.

This surface free energy is a value calculated from a contact angle of a water drop on the surface of the cured material which is obtained by curing the multifunctional monomer (A) in a film form or a plate form with a smooth surface. The contact angle is determined by the surface free energies of the solid and the liquid, and the relationship is represented by Young's equation. In the present invention, the surface free energy of water was assumed to be 72.8 mJ/m², and the surface free energy of the cured material of the multifunctional monomer (A) was calculated from the measured value of the contact angle by the Young's equation.

The multifunctional monomer (A) has three or more radical polymerizable functional groups in a molecule. By this, the molecular weight between the cross-linked points of the cured material of the resin composition obtained becomes smaller, and the elastic modulus and the hardness of the cured material become higher, and the material with an excellent abrasion resistance can be obtained. This radical polymerizable functional group is typically (meth)acryloyl radical.

In the multifunctional monomer (A), the value of a molecular weight thereof divided by the number of the radical polymerizable functional group (molecular weight/number of radical polymerizable functional group) is 110 to 200, is preferably 120 to 180, and is more preferably 130 to 150. When this value of the molecular weight of multifunctional monomer (A) divided by the number of the radical polymerizable functional group (molecular weight/number of radical polymerizable functional group) is 110 or more, it can be prevented that the molecular weight between the cross-linked points of the cured material becomes too low, and that the cured material becomes hard and brittle thereby. Also, when it is 200 or less, the elastic modulus, the hardness and the abrasion resistance of the cured material can be improved.

For example, in the case of trimethylolpropane triacrylate that is a typical trifunctional monomer, the molecular weight is 296 and the number of the radical polymerizable functional group is 3. Thus, the value of molecular weight/number of radical polymerizable functional group is equal to 98.7. Also, for example in the case of a tetrafunctional monomer with a molecular weight of higher than 800 or a hexafunctional monomer with a molecular weight of higher than 1200, the value of molecular weight/number of radical polymerizable functional group comes to be larger than 200. These are different from the multifunctional monomer (A) used in the present invention.

Examples of multifunctional monomer (A) include, for example, urethane (meth)acrylates, epoxy (meth)acrylates, polyester (meth)acrylates and polyether (meth)acrylates. This may be used alone, or in combination with two or more.

Specific examples of multifunctional monomer (A) are as follows.

Examples of the trifunctional monomer include ethoxy modifications, propoxy modifications, ethoxy propoxy modifications or butoxy modifications of trimethyloipropane tri(meth)acrylate; ethoxy modifications, propoxy modifications, ethoxy propoxy modifications or butoxy modifications of pentaerythritol tri(meth)acrylate; ethoxy modifications, propoxy modifications, ethoxy propoxy modifications or butoxy modifications of pentaerythritol tetra(meth)acrylate; ethoxy modifications, propoxy modifications, ethoxy propoxy modifications or butoxy modifications of isocyanuric acid tri(meth)acrylate; and ethoxy modifications, propoxy modifications, ethoxy propoxy modifications or butoxy modifications of glycerin triacrylate.

Examples of the tetrafunctional monomer include ethoxy modifications, propoxy modifications, ethoxy propoxy modifications or butoxy modifications of pentaerythritol tetra (meth)acrylate; and ethoxy modifications, propoxy modifications, ethoxy propoxy modifications or butoxy modifications of ditrimethylolpropane tetra(meth)acrylate.

Examples of the multifunctional monomer with five or more functional groups include ethoxy modifications, propoxy modifications, ethoxy propoxy modifications or butoxy modifications of dipentaerythritol hexa(meth)acrylate.

Also, urethane (meth)acrylates obtained by reacting an (meth)acrylate having a hydroxyl group or the like with a polyol or an isocyanate compound may be used as the multifunctional monomer (A). Examples of this commercially-supplied urethane (meth)acrylate include, for example, "NK Oligo (trademark) U-6HA" made by Shin Nakamura Chemical Co., Ltd., 220, 1290, 5129 and 8210 of "EBECRYL (registered trademark)" series and 8200 of "KRM (registered trademark)" series which are made by DAICEL-CYTEC Company Ltd., and "UA-306H" made by Kyoeisha Chemical Co., Ltd.

Among the above-mentioned specific examples of multifunctional monomer (A), ethoxy modifications of trimethylolpropane tri(meth)acrylate, ethoxy modifications of pentaerythritol tri(meth)acrylate, ethoxy modifications of pentaerythritol tetra(meth)acrylate, ethoxy modifications of ditrimethylolpropane tetra(meth)acrylate and ethoxy modifications of dipentaerythritol hexa(meth)acrylate are preferable particularly from the viewpoint of polymerization reactivity. Also, as a commercially-supplied material, ATM-4E and A-TMPT-3EO of "NK ester (trademark)" series made by Shin Nakamura Chemical Co., Ltd., "EBECRYL (registered trademark) 40" made by DAICEL-CYTEC Company Ltd., "NEW FRONTIER (registered trademark) TMP-2" made by Dai-ichi Kogyo Seiyaku Co., Ltd. and "LIGHT ACRYLATE (trademark) TMP-6EO-A" made by Kyoeisha Chemical Co., Ltd. are preferable.

The content of multifunctional monomer (A) is 70 to 95 parts by mass with respect to 100 parts by mass of the total content of all monomer in the composition, is preferably 75 to 95 parts by mass, and is more preferably 80 to 90 parts by mass. When it is 70 parts by mass or more, the elastic modulus, the hardness and the abrasion resistance of the cured material can be improved. Also, when it is 95 parts by mass or less, it can be prevented that the elastic modulus of the cured material becomes too high, that the cured material becomes hard and brittle thereby, and that a crack is generated when it is detached from the stamper, and the cured material has a good abrasion resistance.

(Fluorine (Meth)Acrylate (B))

The fluorine (meth)acrylate (B) is a compound which has one or more radical polymerizable functional groups and a fluorine atom in the molecule, and plays a roll to provide water-repellency to the cured material of the resin composition.

The fluorine (meth)acrylate (B) is a compound which is compatible with the multifunctional monomer (A). If the fluorine (meth)acrylate is not compatible with the multifunctional monomer (A), the resin composition is cloudy. Alternatively, even if the resin composition is transparent, the cured material becomes turbid or hazy. Generally, when the content of fluorine atom in the molecule is reduced, it comes to be easily compatible with the multifunctional monomer (A). However, from the viewpoint of water-repellent, the content of fluorine atom is preferably large.

From the viewpoint of balancing the transparency and compatibility, the fluorine (meth)acrylate (B) is preferably a compound in which a segment for compatibility with the multifunctional monomer (A) is introduced between the fluorine atom-containing site such as a polyfluoroalkyl chain or a perfluoropolyether chain with a carbon number of 4 or more and the (meth)acryloyl group that is the polymerizable functional group. Specific examples of the segment include polyalkylene oxide structures such as polyethylene glycol and high polar structures such as urethane bond. Also, an alkyl chain can be used. By using the compound, a resin composition with both good transparency and good compatibility can be obtained. Also, if the fluorine atom-containing site in the molecules has a branched structure, it comes to be easily compatible with the multifunctional monomer (A).

Here, fluorine content b is a value of a total mass of fluorine atom contained in the fluorine (meth)acrylate (B) divided by a molecular weight of the fluorine (meth)acrylate (B). For example, in the case of 2,2,3,3,4,4,5,5-octafluoropentyl methacrylate (molecular weight=300, number of fluorine atom=8), fluorine content b is 50.7% from 19×8/300×100.

From the viewpoint of water-repellent, fluorine content b is preferably 40% or more, is more preferably 44% or more, and particularly preferably 47% or more. Also, from the viewpoint of compatibility, it is preferably 60% or less, and preferably 55% or less.

However, the compatibility of fluorine (meth)acrylate (B) with the multifunctional monomer (A) is affected by the kinds of both monomers. Thus, it is necessary to individually confirm whether or not to be compatible in the present invention by the combination actually used. The confirmation is conducted by the haze value of the mixture and the cured material. The haze value is a ratio of diffusion transmitted light to total light transmittance when light is irradiated, and can be measured with a common turbidimeter (for example, NDH series made by NIPPON DENSHOKU INDUSTRIES CO., LTD. or the like). In the present invention, if the haze value of the mixture liquid of 90 parts of multifunctional monomer (A) and 10 parts of fluorine (meth)acrylate (B) is 5 or less, it is deemed compatible. If it is over the value, it is deemed incompatible.

The fluorine (meth)acrylate (B) has one or more radical polymerizable functional groups in a molecule. When the radical polymerizable functional group exists in the molecule, the molecule is introduced into a cured material, and bleed out is suppressed. This radical polymerizable functional group is typically (meth)acryloyl group.

Specific examples of fluorine (meth)acrylate (B) are shown below.

Examples of the compound having an urethane bond (segment) between the fluorine atom-containing site and the (meth)acryloyl group include, for example, compounds obtained by reacting an isocyanate group-containing (meth)acrylate such as 2-isocyanate ethyl acrylate with a fluorine-containing alcohol such as perfluoroisobutoxy diethylene glycol or perfluoroethoxy triethylene glycol. Compounds obtained by reacting an isocyanate group-containing acrylate with a fluorine-containing alcohol are preferable from the viewpoint that it is easily produced as long as the raw material can be provided. Also, it is preferable that the compound has an urethane bond because the cured material finally obtained has an appropriate toughness given.

Examples of the compound having a polyalkylene oxide structure (segment) between the fluorine atom-containing site and the (meth)acryloyl group include, for example, compounds obtained by adding ethylene oxide to perfluorohexanol and by reacting the terminal hydroxyl group with acrylic acid chloride.

The raw alcohol used for the synthesis of each above-mentioned compound can be obtained as a commercially-supplied material. For example, "C5GOL", "C8GOL" and the like which are made by Exfluor Research, fluorine nonionic surfactant "N-1287" made by Dai-ichi Kogyo Seiyaku Co., Ltd., reactive organic fluorine compound "MF-100" made by Mitsubishi Materials Electronic Chemicals Co., Ltd. and the like can be used. Also, for example, "Karenz (registered trademark) AOI" made by Showa Denko K. K. can be used as an (meth)acrylate having an isocyanate group.

The fluorine (meth)acrylate (B) may be used alone, or in combination with two or more.

The content of fluorine (meth)acrylate (B) is 5 to 30 parts by mass with respect to 100 parts by mass of the total content of all monomers in the composition, is preferably 5 to 25 parts by mass, is more preferably 5 to 20 parts by mass, is particularly preferably 5 to 15 parts by mass, and is most preferably 5 to 13 parts by mass. When it is 5 parts by mass or more, the surface free energy of the cured material can be lowered to easily develop water-repellent. Also, when it is 30 parts by mass or less, the elastic modulus and the abrasion resistance of the cured material can be improved.

(Fluorine (Meth)Acrylate (C))

The resin composition of the present invention may further contain fluorine (meth)acrylate (C) which is incompatible with the multifunctional monomer (A) as a polymerizable monomer component along with above-mentioned multifunctional monomer (A) and the fluorine (meth)acrylate (B). By containing this fluorine (meth)acrylate (C), water-repellent can more effectively be given. In the case where this fluorine (meth)acrylate (C) is used, it is preferably a resin composition by mixing the multifunctional monomer (A), the fluorine (meth)acrylate (B) and fluorine (meth)acrylate (C) so that they are not separated from one another.

Note that, if only multifunctional monomer (A) and fluorine (meth)acrylate (C) are used without using the fluorine (meth)acrylate (B), the resin composition is cloudy or completely separates them because the both are compatible. That is, only when fluorine (meth)acrylate (C) is used in the presence of the fluorine (meth)acrylate (B), the resin composition with clearness can be obtained.

Fluorine (meth)acrylate (C) is a compound which has one or more radical polymerizable functional group and a fluorine atom in the molecule. When the radical polymerizable functional group exists in the molecule, the molecule is introduced into a cured material, and bleed out is suppressed. This radical polymerizable functional group is typically (meth)acryloyl group.

Fluorine content c of fluorine (meth)acrylate (C) is preferably 50% or more. This fluorine content c is a value calculated by the same method as that of fluorine content b of the fluorine (meth)acrylate (B) that is described above.

Specific examples of fluorine (meth)acrylate (C) are shown below.

Examples of the fluorine (meth)acrylate with fluorine content c of 50% or more include, for example, 2,2,3,3,4,4,5,5,6,6,7,7,8,8,9,9,9-perfluorononyl (meth)acrylate. Also, examples of the fluorine (meth)acrylate having a urethane bond between the fluorine-containing site and the acryloyl group include, for example, compounds obtained by reacting 2-isocyanato ethyl acrylate with a fluorinated alcohol such as perfluoro-normalbutoxy triethylene glycol or perfluoroethylhexyl triethylene glycol. Also, they include compounds in which a segment for compatibility with the multifunctional monomer (A) is not introduced between the fluorine-containing site and the acryloyl group. For example, compounds by directly reacting acrylic acid chloride with a terminal hydroxyl group of a perfluoropolyether correspond to this. This may be used alone, or in combination with two or more.

The raw alcohol used for the synthesis of the above-mentioned compound can be obtained as a commercially-supplied material. For example, "C10GOL" made by Exfluor Research and the like can be used.

The properties of the resin composition of the present invention are greatly affected by the multifunctional monomer (A) that is a main component. However, since the viscosity of this multifunctional monomer (A) is usually high, the handling ability of the resin composition may decrease. In such a case, in order to improve the handling ability, it should be diluted with a monofunctional monomer or a bifunctional monomer with a low viscosity. However, in the bifunctional monomer, when one polymerizable functional group is reacted, the reactivity of the remaining polymerizable functional group is easy to be lowered. Thus, monofunctional monomer is suitable to improve the polymerization reactivity in the whole resin composition.

Also, the resin composition is generally used by curing it on a substrate for integration with the substrate. At this, if a monofunctional monomer or a bifunctional monomer with a low molecular weight is used together, the adhesion of the substrate with the cured material of the resin composition becomes better. The kind of the monofunctional monomer or the bifunctional monomer may appropriately be selected depending on the material of the substrate.

The content of fluorine (meth)acrylate (C) is preferably determined with consideration for the balance with the content of fluorine (meth)acrylate. (B) from the viewpoint of obtaining a transparent and clear resin composition. For example, in the case where the content of fluorine (meth)acrylate (B) is high, the content of fluorine (meth)acrylate (C) can also relatively be increased. Further, in the case where fluorine content c of fluorine (meth)acrylate (C) is high, the content of fluorine (meth)acrylate (C) is preferably made lower therefor than the content of fluorine (meth)acrylate (B). As for the balance of both contents, both fluorine contents b and c satisfy the following equation.

$$[b \times \text{content of } (B) + c \times \text{content of } (C)]/[\text{content of } (B) + \text{content of } (C)] \leq 51.5\%$$

The content of fluorine (meth)acrylate (C) is preferably 20 parts by mass or less with respect to 100 parts by mass of the total content of all monomers in the composition, is more preferably 15 parts by mass or less, is particularly preferably 2 to 12.5 parts by mass, and is most preferably 5 to 12.5 parts by mass. When it is 20 parts by mass or less, the compatibility and the transparency of the resin composition can be improved. Also, it is preferable to contain the fluorine (meth)acrylate (B) and fluorine (meth)acrylate (C) in a total amount of 10 parts by mass or more.

(Monomer (D))

The resin composition of the present invention may contain monomer (D) having one or more radical polymerizable functional group in a molecule except for above-mentioned monomers (A) to (C) as a polymerizable monomer component. By appropriately containing this monomer (D), the polymerization reactivity of the whole resin composition is kept good and the handling ability and adhesion with the substrate can be further improved.

Monomer (D) is preferably a monomer which has a surface free energy when cured is 45 mJ/m$^2$ or more. Also, if a monomer which has the surface free energy of less than 45 mJ/m$^2$, the content of monomer (D) is preferably low so that the monomer (D) which has a surface free energy of a middle value between those of multifunctional monomer (A) and the fluorine (meth)acrylate (B) do not inhibit the phase separation associated with the curing of the resin composition.

Specific examples of monomer (D) include alkyl (meth)acrylates such as methyl (meth)acrylate, ethyl (meth)acrylate, n-butyl (meth)acrylate, i-butyl (meth)acrylate, t-butyl (meth)acrylate, 2-ethylhexyl (meth)acrylate, and lauryl (meth)acrylate; benzyl (meth)acrylate; (meth)acrylates having an alicyclic structure such as isobornyl (meth)acrylate, tetrahydrofurfuryl (meth)acrylate, adamanthyl (meth)acrylate, dioyclopentanyl (meth)acrylate, and dicyclopentenyl (meth)acrylate, (meth)acrylates having an amino group such as dimethylaminoethyl (meth)acrylate and dimethylaminopropyl (meth)acrylate; (meth)acrylates having a hydroxyl group such as 2-hydroxyethyl (meth)acrylate and hydroxypropyl (meth)acrylate; (meth)acrylamide derivatives such as (meth)acryloyl morpholine and N,N-dimethyl (meth)acrylamide; 2-vinylpyridine; 4-vinylpyridine; N-vinyl pyrrolidone; N-vinyl formamide; and vinyl acetate. This may be used alone, or in combination with two or more. Among these, from the viewpoint of lap reactiveness, a monomer which is not bulky is preferable. Specifically, (meth)acryloyl morpholine, 2-hydroxyethyl (meth)acrylate, N,N-dimethyl (meth)acrylamide, N-vinyl pyrrolidone, formamide, methyl (meth)acrylate and ethyl (meth)acrylate are preferable. Also, in the case where an acrylic film is used as a substrate, methyl (meth)acrylate and ethyl (meth)acrylate are particularly preferable.

The content of monomer (D) is desirably 20 parts by mass or less with respect to 100 parts by mass of the total content of all monomers in the composition, is preferably 0 to 15 parts by mass, is more preferably 0 to 10 parts by mass, is particularly preferably 1 to 10 parts by mass, and is most preferably 3 to 10 parts by mass. When it is 20 parts by mass or less, the good curability of the resin composition can be obtained and it can be prevented that the elastic modulus and abrasion resistance of the cured material is negatively affect due to a remaining monomer that works as a plasticizer.

<Activation Energy Ray Polymerization Initiator (E)>

The resin composition of the present invention preferably contains an activation energy ray polymerization initiator (E). This activation energy ray polymerization initiator (E) is not specifically limited and may be a compound which can be cleaved by irradiating an activation energy ray to generate a radical which can initiate a polymerization reaction of a polymerizable monomer component. Here, "activation energy ray" means, for example, an electron beam, an ultra-violet ray, a visible ray, a plasma, a heat ray such as an infrared ray, or the like. In particular, from the viewpoint of the equipment cost and the productivity, it is preferable to use an ultra-violet ray.

Activation energy ray polymerization initiator (E) is not specifically limited. Examples thereof include benzophenone, 4,4-bis(diethylamino)benzophenone, 2,4,6-trimethylbenzophenone, methyl ortho-benzoyl benzoate, 4-phenyl benzophenone, t-butyl anthraquinone, and 2-ethylanthraquinone; thioxanthones such as 2,4-diethyl thioxanthone, isopropyl thioxanthone, and 2,4-dichloro thioxanthone; acetophenones such as diethoxy acetophenone, 2-hydroxy-2-methyl-1-phenylpropane-1-one, benzyl dimethyl ketal, 1-hydroxycyclohexyl-phenyl ketone, 2-methyl-2-morpholino(4-thiomethylphenyl)propane-1-one, and 2-benzyl-2-dimethylamino-1-(4-morpholinophenyl)-butanone; benzoin ethers such as benzoin methyl ether, benzoin ethyl ether, benzoin isopropyl ether, and benzoin isobutyl ether; acyl phosphine oxides such as 2,4,6-trimethylbenzoyl diphenylphosphine oxide, bis(2,6-dimethoxybenzoyl)-2,4,4-trimethylpentylphosphine oxide, and bis(2,4,6-trimethylbenzoyl)-phenylphosphine oxide; and methylbenzoyl formate, 1,7-bisacridinylheptane, and 9-phenylacridine are included. This may be used alone, or in combination with two or more. In particular, it is preferable to use two or more kinds with a different absorption wavelength together.

Also, as necessary, a thermal polymerization initiator such as a persulfate such as potassium persulfate or ammonium persulfate, a peroxide such as benzoylperoxide, or an azo initiator may be used together.

The content of activation energy ray polymerization initiator (E) is preferably 0.01 to 10 parts by mass with respect to 100 parts by mass of the total content of all monomers in the composition, is more preferably 0.01 to 5 parts by mass, and particularly preferably 0.2 to 3 parts by mass. When it is 0.1 part by mass or more, the good curability of the resin composition and the good mechanical property (in particular, abrasion resistance) of the cured material are obtained. When it is 10 parts by mass or less, it can be prevented that the elastic modulus and the abrasion resistance of the cured material are lowered and the cured material is colored due to the remaining initiator in the cured material.

<UV Absorber and/or Antioxidant (F)>

The resin composition of the present invention may contain UV absorber and/or antioxidant (F). Examples of the UV absorber include, for example, benzophenone UV absorbers, benzotriazole UV absorbers, and benzoate UV absorbers. Examples of the commercially-supplied material include 400 and 479 of "TINUVIN (registered trademark)" series made by Ciba Specialty Chemicals and 110 of "Viosorb (registered trademark)" made by Kyodo Chemical Co., Ltd. Examples of the antioxidant include, for example, phenol antioxidants, phosphorus antioxidants, sulfur antioxidants, and hindered amine antioxidants. Examples of the commercially-supplied material include "IRGANOX (registered trademark)" series made by Ciba Specialty Chemicals. This UV absorber and antioxidant may be used alone, or in combination with two or more.

The content of UV absorber and/or antioxidant (F) is preferably 0.01 to 5 parts by mass with respect to 100 parts by mass of the total content of all monomers in the composition, is more preferably 0.01 to 1 parts by mass, and particularly preferably 0.01 to 0.5 parts by mass. When it is 0.01 part by mass or more, the good weathering resistance can be obtained, and yellow coloration, haze increase and the like are suppressed. Also, when it is 5 parts by mass or less, the good polymerizability and the good abrasion resistance can be obtained, and it is also suppressed that the adhesion of the cured material with the substrate is lowered due to volatilization of the compound with a low molecular weight in the weathering test.

<Other Additive>

As necessary, the resin composition of the present invention may contain a known additive such as a mold lubricant, a lubricant, a plasticizer, an antistatic agent, a light stabilizer, a flame retardant, a flame retardant auxiliary agent, a polymerization inhibitor, a filler, a silane coupling agent, a coloring agent, a reinforcing agent, an inorganic filler, and an impact resistance modifier.

Also, the resin composition of the present invention may contain a solvent, but does not preferably contain a solvent. When a solvent is not contained, for example, in the process of polymerizing and curing the resin composition by irradiation of an activation energy ray in a state in which the resin composition is poured, and of releasing it from the mold, there remains a solvent medium in the cured material. Also, with consideration for the production step, the used of the solvent medium is not preferable because the investment for the equipment to remove the solvent medium is necessary and it results in the cost increase.

<Properties of the Resin Composition>

With consideration for pouring the resin composition into the stamper for forming a nano concave-convex structure, the viscosity of the resin composition which is measured with a rotating B type viscometer in 25° C. is preferably 10000 mPa·s or less, is more preferably 5000 mPa·s or less, and is particularly preferably 2000 mPa·s or less. However, even if the viscosity of the resin composition is 10000 mPa/s or more, if it can previously be heated to lower the viscosity when poured into the stamper, the resin composition can be used without lowering workability. Also, the viscosity of the resin composition which is measured with a rotating B type viscometer in 70° C. is preferably 5000 mPa·s or less, and is more preferably 2000 mPa·s or less.

On the other hand, with consideration for continuous production using a belt or roll stamper for forming a nano concave-convex structure, the viscosity of the resin composition which is measured with a rotating B type viscometer in 25° C. is preferably 100 mPa·s or more, is more preferably 150 mPa·s or more, and is particularly preferably 200 mPa·s or more. When it is 100 mPa·s or more, the resin composition is hardly leaked to the side beyond the width of the stamper in the step of pressing the stamper and the thickness of the cured material can arbitrarily easily be adjusted.

The viscosity of the resin composition can be adjusted by selecting the kind and the content of the monomer. Specifically, when a monomer having a functional group or chemical structure such as hydrogen bond which has an intermolecular interaction is used in large amounts, the viscosity of the resin composition becomes higher. Also, when a monomer with a low molecular weight which does not have an intermolecular interaction is used in large amounts, the viscosity of the resin composition becomes low.

Since the resin composition of the present invention explained above contains the multifunctional monomer (A) which has a high surface free energy when cured and the fluorine (meth)acrylate (B) which has a low surface free energy, the phase separation occurs when the resin composition is cured and the fluorine (meth)acrylate (B) is eccentrically located on the surface of the cured material. As a result, in the cured material obtained, an abrasion resistance can be developed by the multifunctional monomer (A) and a water-repellent can be developed by the fluorine (meth)acrylate (B) eccentrically located on the surface of the cured material. Thus, the cured material formed can have a high abrasion resistance and a good water-repellent, <Nano Concave-Convex Structure Body>

The resin composition of the present invention can be polymerized and cured to use a molded article, which is extremely useful particularly as a nano concave-convex structure body having a nano concave-convex structure on the surface. Specifically, for example, it is suitable for a resin composition which is used when a nano concave-convex structure is transcribed by transcription method using a stamper in which an inverted nano concave-convex structure is formed.

FIGS. 1(a) and 1(b) are a schematic cross-sectional view showing an embodiment of the nano concave-convex structure body 10 obtained by the present invention. FIG. 1 exemplifies a situation in which layer (outer layer) 12 consisting of the cured material of the resin composition of the present invention is laminated on substrate 11. The surface of layer 12 consisting of the cured material of the resin composition has a nano concave-convex structure which develops a function such as antireflection of the surface. Specifically, convex portion 13 and concave portion 14 are formed on the surface of layer 12 at an equal spacing. In particular, the configuration of convex portion 13 of FIG. 1(a) is a conical shape or a pyramid shape, and the configuration of convex portion 13 of FIG. 1(b) is a bell shape. However, the configuration of convex portion 13 of the nano concave-convex structure is not limited as long as it is a structure in which the occupancy of the cross-section is continuously increased when the surface of layer 12 is cut. Also, more microscopic convex portions may be connected to form a nano concave-convex structure. That is, it may have a configuration except for FIGS. 1(a) and 1(b) as long as the refraction index is continuously increased from air to the material surface and it shows an antireflection performance with a balance of low reflectivity and low wavelength dependence.

In order to develop a good antireflection performance, it is necessary that the spacing of between adjacent convex portions 13 or concave portions 14 [spacing w1 of center points (tops) 13a of the adjacent convex portions in FIG. 1(a)] of the nano concave-convex structure is a size equal to or less than the wavelength of the visible light. Here, "visible light" means a light with a wave length of 380 to 780 nm. When this spacing w1 is 380 nm or less, the scattering of the visible light can be suppressed. In this case, the nano concave-convex structure body of the present invention can preferably be used for optic purposes such as an antireflection coating. Also, from the viewpoint of suppressing an increase of the lowest reflection rate or the reflection rate at a specific wavelength, the height of the convex portion or the depth of the concave portion [vertical distance d1 from center point (bottom) 14a of the concave portion to center point (top) 13a of the convex portion in FIG. 1(a)] is preferably 60 nm or more and is more preferably 90 nm or more.

The nano concave-convex structure described above is not limited to the embodiment shown in FIG. 1, and it can be formed wholly or partly on one or all sides of the cured material of the resin composition of the present invention. Also, in order to effectively develop the water-repellent performance, it is preferable that the tip of the projection of the convex portion is thin, and it is preferable the area occupied by the cured material on the contact surface of the water drop with the nano concave-convex structure body is as small as possible.

<Production Method>

Examples of the method for producing a nano concave-convex structure body include, for example, (1) a method which contains providing the resin composition between a stamper and a substrate which have an inversion structure of a nano concave-convex structure, curing the resin composition by irradiation of an activation energy ray to transfer the concave-convex structure of the stamper, and thereafter detaching the stamper, and (2) a method which contains detaching the stamper after transferring the concave-convex structure of the stamper, and thereafter curing the resin composition by irradiation of an activation energy ray. Among these, from the viewpoint of the transcription property of the nano concave-convex structure and the flexibility of the surface composition, method (1) is preferably preferable. This method is particularly suitable in the case of using a belt or roll stamper by which the continuous production can be conducted, and is an excellent method in productivity.

(Substrate)

The substrate is preferably a transparent substrate, namely a molded body in which a light is transmitted. Examples of the material composing the transparent substrate include, for example, synthetic polymers such as methyl methacrylate (co)polymers, polycarbonates, styrene (co)polymers, and methyl methacrylate-styrene copolymer, semisynthetic polymers such as cellulose diacetates, cellulose triacetates, and cellulose acetate butyrate, polyesters such as polyethylene terephthalates and polylactic acids, polyamides, polyimides, polyethersulfones, polysulfones, polyethylenes, polypropylenes, polymethylpentenes, polyvinyl chlorides, polyvinyl acetals, polyether ketones, polyurethanes, the complexes of these polymers (complexes of a polymethyl methacrylate and a polylactic acid, complexes of polymethyl methacrylate and polyvinyl chloride and the like), and glasses.

The shape of the substrate and the production method are not specifically limited. For example, an injection-molded body, an extruded body or a cast-molded body can be used. Also, as the shape it may be a sheet or a film. Further, for the purpose of improving the property such as adhesion, antistatic property, abrasion resistance or weathering resistance, the coating or corona treatment may be conducted on the surface of the transparent substrate.

(Stamper)

The method for forming a nano concave-convex structure to the stamper is not specifically limited. Specific examples thereof include electron beam lithography method and laser beam interference method. For example, a mold with a nano concave-convex structure can be obtained by applying a suitable photoresist coating on a suitable supporting substrate, by exposing it by a light such as an ultra-violet ray laser, an electron ray or an X-ray, and by develop it. The mold can be just used as a stamper, but the nano concave-convex structure can also be formed directly on the supporting substrate itself by selectively etching the supporting substrate through a photoresist layer by dry etching to remove a resist layer.

Also, an anodized porous alumina can be used as the stamper. For example, a porous structure of 20 to 200 nm which is formed by anodize aluminum at a predetermined voltage using oxalic acid, sulfuric acid, phosphoric acid or the like as an electrolyte may be used as the stamper. According to this method, a pore with very high regularity can self-organizationally be formed by anodizing high purity aluminum for a long time at a constant voltage and thereafter by removing the oxide film once, and by anodizing it again. Further, by connecting the anodizing treatment with a pore-enlarging treatment in the second anodizing step, the nano concave-convex structure whose section is not a rectangular but a triangle or a bell shape can be formed. Also, by appropriately adjusting the time and condition of the anodizing treatment and the pore-enlarging treatment, the angle of the innermost part of the pore can be sharpened.

Further, a replicated mold was produced from an original mold having a nano concave-convex structure and it can be used as the stamper.

The shape of the stamper itself is not specifically limited, and the stamper may be a flat plate, a belt or a roll. In particular, if it is a belt or a roll, the nano concave-convex structure can continuously transferred and the productivity can further be improved.

(Curing Conditions)

The polymerization and curing method by irradiation of an activation energy ray is preferably a polymerization and curing method by irradiation if an ultra-violet ray. Examples of the ramp for irradiating an ultra-violet ray include high pressure mercury lamps, metal halide lamps, and fusion lamps.

The irradiation amount of the ultra-violet ray may be determined depending on the absorption wavelength and the content of the polymerization initiator. Usually, the integrated amount of light is preferably 400 to 4000 mJ/cm$^2$, and is more preferably 400 to 2000 mJ/cm$^2$. When it is 400 to 4000 mJ/cm$^2$ or more, the resin composition is sufficiently cured and the lowering of the abrasion resistance due to the under-curing can be prevented. Also, when it is 4000 mJ/cm$^2$ or less, the coloration of the resin composition and the deterioration of the substrate are prevented. The irradiation intensity is also not specifically limited, but it is preferable that the power output is reduced so that the deterioration of the substrate or the like does not occur.

In the nano concave-convex structure body obtained by the polymerization and curing, the nano concave-convex structure of the stamper on the surface is transferred in the relationship of a key and a key hole.

The nano concave-convex structure body consisting of the cured material of the resin composition of the present invention has both a high abrasion resistance and a good water-repellent, and an excellent antireflection performance can be developed by an continuous change of the refractive index. Thus, the nano concave-convex structure body of the present invention is suitable as an antireflection coating (including an antireflection film) and an antireflection body of the three-dimensional configuration. Also, the resin composition of the present invention is useful as a coding material to form a cured coating on various kinds of the substrate.

Further, the resin composition of the present invention can be used as a raw material for imprint. This raw material for the imprint is not limited to that for UV imprint in which it is UV cured after the resin composition as described above is poured into the stamper, and may be used for the method of heat imprint or the like in which it is cured by heat after it is poured into the stamper. The method, which contains pressing the stamper into the resin composition partially-cured by a hearing to transfer the configuration, thereafter detaching it from the stamper, and completely curing it by hear or UV, can be used.

<Water-Repellent Article>

The water-repellent article of the present invention may be an article having a nano concave-convex structure body which has a nano concave-convex structure surface obtained by polymerizing and curing the resin composition of the present invention, and may be an article obtained by polymerizing and curing the resin composition of the present invention. In particular, the water-repellent article having a nano concave-convex structure body has a high abrasion resistance and a good water-repellent, and an excellent antireflection performance is developed. The nano concave-convex structure body can be used by attaching it on a surface of, for example, a window material, a roof tile, an exterior illumination, a curved mirror, a window for cars and a mirror for cars.

Also, if the nano concave-convex structure body of the present invention is used as an antireflection coating, it comes to be an antireflection coating which has not only an antireflection performance but also a high abrasion resistance and a good water-repellent performance. The nano concave-convex structure body can be used by attaching it on a surface of, for example, a target object such as a picture display device such as a liquid crystal display, a plasma display panel, an electroluminescence display, or a cathode ray tube display, a lens, a show window, and a spectacle lens.

If the nano concave-convex structure body is attached on a portion of the three-dimensional configuration of the target object, the substrate with a corresponding configuration may be used, and the layer consisting of the cured material of the resin composition of the present invention may be formed on this substrate to obtain the nano concave-convex structure body, and it may be attached on the predetermined portion of the target object. Also, if the target object is a picture display unit, it may be attached on the surface as well as on the front plate, and the front plate itself can be made of the nano concave-convex structure body.

Also, the nano concave-convex structure body of the present invention is applicable to, for example, the optical purposes such as light guides, relief holograms, lenses and polarized light isolation elements and the purpose of cell culturing sheets.

EXAMPLE

As follows, the present invention is concretely explained with showing Examples. However, the present invention is not limited thereto. In the following description, "part(s)" means "part(s) by mass" unless otherwise noted. Also, various measurement and evaluation methods are as follows.

(1) Measurement of the Pore of the Stamper:

Pt vapor deposition was carried out for 1 minute to a vertical cross-section of a part of a stamper which consists of an anodized porous alumina, and it was observed at an accelerating voltage of 3.00 kV with an electron emission scanning electron microscope (made by JEOL Ltd., trade name: JSM-7400F) to measure the spacing (pitch) between adjacent pores and the depth of the pore. Concretely, the value was measured at each of 10 points and the average value thereof was assumed to be a measured value.

(2) Measurement of the Concavity and Convexity of the Nano Concave-Convex Structure Body:

Pt vapor deposition was carried out for 10 minutes to a vertical cross-section of a nano concave-convex structure body, and the spacing between adjacent convex or concave portions and the depth of the convex portion were measured with the same equipment under the same conditions as in the case of above-mentioned (1). Concretely, the value was measured at each of 10 points and the average value thereof was assumed to be a measured value.

(3) Evaluation of the Appearance:

The appearance of the nano concave-convex structure body was observed by visual inspection and was evaluated by the following criteria.

"◯": It is uniform transparent with no turbidness.

"Δ": There is partial turbidness. It is slight hazy.

"X": It is translucent with clear turbidness.

(4) Evaluation of the Abrasion Resistance:

The surface of the nano concave-convex structure body was abraded 1000 times under the conditions in which the load of 100 g was applied, the reciprocating distance was 50 mm, and the head speed was 60 mm/s, using an abrasion testing machine (made by Shinto Scientific Co., Ltd., HEIDON) to which 1 cm-square canvas cloth was mounted. After that, the appearance was observed by visual inspection and was evaluated by the following criteria.

"⊚": No abrasion is observed.

"◯": 1 to 2 abrasions are observed.

"Δ": 3 to 5 abrasions are observed.

"X": 6 or more abrasions are observed.

(5) Evaluation of the Water Repellency (Measurement of the Contact Angle):

1 μL of ion-exchange water was dropped on the nano concave-convex structure body, and the contact angle was calculated by θ/2 method using an automatic contact angle measuring equipment (made by KRUSS).

<Production of the Stamper>

An aluminum plate with a purity of 99.99% was buffed and electropolished in a mixture solution of perchloric acid/ethanol (volume ratio of 1/4) to make it mirror surface.

(a) step:

This aluminum plate was anodized in an aqueous solution of 0.3 M oxalic acid under the conditions in which the continuous current is 40 V and the temperature is 16° C. for 30 minutes.

(b) step:

The aluminum plate having an oxide film formed was immersed in a mixture aqueous solution of 6 mass % phosphoric acid/1.8 mass % chromic acid for 6 hours to remove the oxide film.

(c) step:

This aluminum plate was anodized in an aqueous solution of 0.3 M oxalic acid under the conditions in which the continuous current is 40 V and the temperature is 16° C. for 30 seconds.

(d) step:

The aluminum plate having an oxide film formed was immersed in 5 mass % phosphoric acid at 32° C. for 8 minutes to enlarge the pore size.

(e) step:

Above-mentioned (c) step and (d) step were repeated 5 times in total to obtain an anodized porous alumina having a pore of approximate conical shape with a pitch of 100 nm and a depth of 180 nm.

The anodized porous alumina obtained was washed with deionized water and water on the surface was removed by air blow. It was immersed for 10 minutes in a solution obtained by diluting a surface antifouling coating agent (made by Daikin Industries Ltd., trade name: OPTOOL DSX) with a diluent (made by HARVES Co., Ltd., trade name: HD-ZV) so that the solid content of the surface antifouling coating agent was 0.1 mass %, and it was air-dried for 20 hours to obtain a stamper.

<Polymerizable Monomer Component>

The properties of each monomer used in Examples and Comparative examples are shown in TABLE 1 and TABLE 2.

The surface free energy of multifunctional monomer (A) was calculated as follows. The monomer was cured in a smooth film form and 1 μL of ion-exchange water was dropped on the cured material. The contact angle was measured by θ/2 method using an automatic contact angle measuring equipment (made by KRUSS). Then, the measured value of the contact angle was substituted into the Young's equation, and the surface free energy of the cured material of the monomer was calculated under the surface free energy of water being 72.8 mJ/m$^2$.

TABLE 1

|  |  | Surface Free Energy When Cured [mJ/m$^2$] | Number of Radical Polymerizable Functional Group (N) [Piece] | Molecular Weight (W) [g/mol] | W/N |
|---|---|---|---|---|---|
| Multifunctional Monomer (A) | ATM-4E | 45.9 | 4 | 528 | 132 |
|  | TMPT-6EO | 43.3 | 3 | 560 | 187 |
| Multifunctional Monomer Except for (A) | TAS | 36.0 | 4 | 454 | 114 |

TABLE 2

|  |  | Composition Formula | Total Mass of Fluorine Atom [g/mol] | Molecular Weight [g/mol] | Fluorine Content [%] |
|---|---|---|---|---|---|
| Compatible Fluorine (Meth)acrylate (B) | FA1 | C17H19O5F13 | 247 | 550 | 44.9 |
|  | FA2 | C14H10N1O6F15 | 285 | 573 | 49.7 |
|  | FA3 | C14H10O4F10 | 190 | 432 | 44.0 |
| Incompatible Fluorine (Meth)acrylate (C) | FA4 | C16H10N1O7F19 | 361 | 689 | 52.4 |
|  | FA5 | C13H5O5F19 | 361 | 602 | 60.0 |

The abbreviated codes in TABLE 1 and TABLE 2 are as follows.

"ATM4E": ethoxylated pentaerythritol tetraacrylate (made by Shin Nakamura Chemical Co., Ltd., trade name: NK ester ATM-4E)

"TMPT6EO": ethoxylated trimethylolpropane triacrylate (made by Kyoeisha Chemical Co., Ltd., trade name: LIGHT ACRYLATE TMP-6EO-3A)

"TAS": mixed compound of trimethylolethane/acrylic acid/succinic acid=2/4/1

"FA1": compound by addition of triethylene glycol acrylate to fluorinated hexanol "FA2": compound by addition reaction of 2-isocyanato ethyl acrylate to perfluoroisobutoxy diethylene glycol "FA3": compound by addition reaction of 2-fold acrylic acid chloride in a molar equivalent to fluorinated cyclohexanedimethanol "FA4": compound by addition reaction of 2-isocyanato ethyl acrylate to perfluoro-normal-butoxy triethylene glycol "FA5": compound by addition reaction of acrylic acid chloride to perfluoro-normal-butoxy triethylene glycol (made by Exfluor Research, "C10GACRY").

Example 1

(Preparation of Resin Composition)

80 parts of ethoxylated pentaerythritol tetraacrylate (made by Shin Nakamura Chemical Co., Ltd., trade name: NK ester ATM-4E) as the multifunctional monomer (A), 20 parts of a compound by addition reaction of FA1 as the fluorine (meth) acrylate (B), and 0.5 part of 2-hydroxy-2-methyl-1-phenyl-propane-1-one (made by Nihon Ciba-Geigy, trade name: DAROCURE 1173) and 0.5 part of 2,4,6-trimethylbenzoyl-diphenyl-phosphine oxide (made by Nihon Ciba-Geigy, trade name: DAROCURE TPO) as an activation energy ray polymerization initiator (E) were mixed to obtain an activation energy ray-curable resin composition.

(Production of Nano Concave-Convex Structure Body)

This activation energy ray-curable resin composition was casted on the surface of the stamper where the pore was formed, and the upper surface was coated with a polyethylene terephthalate film with a thickness of 188 μm (made by TOYOBO CO., LTD., trade name: A-4300) with expansion. After that, It was irradiated from the film side with an ultra-violet ray using a fusion lamp at a belt speed of 5.0 m/minute so that the integrated amount of light was 1000 mJ/cm$^2$, to cure the resin composition. Then, the film and the stamper were detached to obtain a nano concave-convex structure body.

The nano concave-convex structure of the stamper was transcribed to the surface of the nano concave-convex structure body and, as shown in FIG. 1(a), a nano concave-convex structure of approximate conical shape with a spacing between adjacent convex portions 13 (distance w1) of 100 nm and a height d1 of convex portion 13 of 180 nm was formed. Also, the water-repellent and the abrasion resistance of this nano concave-convex structure body were evaluated. The results are shown in TABLE 3.

Examples 2 to 22 and Comparative Examples 1 to 10

Nano concave-convex structure bodies with the same size were produced and evaluated in the same manner as in Example 1 except that a resin composition with the compounding composition shown in TABLE 3 and TABLE 4 was used. The results are shown in TABLE 3 and TABLE 4. Note that, the unit of the compounding amount in each TABLE is "part(s)".

TABLE 3

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Multifunctional Monomer (A) | ATM-4E | 80 | 77 | 80 | 83 | 90 | 85 | 85 | 82.5 | 75 | 85 | 90 |
| | TMPT-6EO | | | | | | | | | | | |
| Multifunctional Monomer Except for (A) | TAS | | | | | | | | | | | |
| Monomer (B) | FA1 | | | | | | | | | | 15 | 10 |
| | FA2 | 20 | 19 | 17 | 15 | 5 | 10 | 7.5 | 7.5 | 7.5 | | |
| | FA3 | | | | | | | | | | | |
| Monomer (C) | FA4 | | | | | 5 | 5 | 7.5 | 10 | 12.5 | | |
| | FA5 | | 4 | 3 | 2 | | | | | | | |
| Monomer (D) | MA | | | | | | | | | 5 | | |
| Polymerization Initiator (E) | DAR1173 | 0.5 | 0.5 | 0.5 | 0.5 | 0.5 | 0.5 | 0.5 | 0.5 | 0.5 | 0.5 | 0.5 |
| | DAR TPO | 0.5 | 0.5 | 0.5 | 0.5 | 0.5 | 0.5 | 0.5 | 0.5 | 0.5 | 0.5 | 0.5 |
| (b × B + c × C)/(B + C) × 100 | | 49.7 | 51.5 | 51.2 | 50.9 | 51.1 | 50.6 | 51.1 | 51.2 | 50.7 | 44.9 | 44.9 |
| Appearance | | ○ | ○ | ○ | ○ | ○ | ○ | ○ | ○ | ○ | ○ | ○ |
| Abrasion Resistance | | Δ | Δ | Δ | Δ | ○ | ○ | ○ | Δ | Δ | Δ | ○ |
| Contact Angle (°) | | 142.6 | 144.9 | 140.7 | 140.6 | 139.8 | 140.4 | 142.2 | 142.5 | 142.4 | 141.8 | 140.4 |

| | | Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Multifunctional Monomer (A) | ATM-4E | 86 | 89 | 85 | 80 | 85 | | | 95 | 95 | 77.5 | 70 |
| | TMPT-6EO | | | | | | 90 | 85 | | | | |
| Multifunctional Monomer Except for (A) | TAS | | | | | | | | | | | |
| Monomer (B) | FA1 | 12.5 | 10 | 10 | 12.5 | | | | 5 | | 20 | |
| | FA2 | | | | | | | | | 5 | | 30 |
| | FA3 | | | | | 14 | 9 | 14 | | | | |
| Monomer (C) | FA4 | | | 5 | 7.5 | | | | | | | |
| | FA5 | 1.5 | 1 | | | 1 | 1 | 1 | | | 2.5 | 2.5 |
| Monomer (D) | MA | | | | | | | | | | | |
| Polymerization Initiator (E) | DAR1173 | 0.5 | 0.5 | 0.5 | 0.5 | 0.5 | 0.5 | 0.5 | 0.5 | 0.5 | 0.5 | 0.5 |
| | DAR TPO | 0.5 | 0.5 | 0.5 | 0.5 | 0.5 | 0.5 | 0.5 | 0.5 | 0.5 | 0.5 | 0.5 |
| (b × B + c × C)/(B + C) × 100 | | 46.5 | 46.3 | 47.4 | 47.7 | 45.1 | 45.6 | 45.1 | 44.9 | 49.7 | 46.6 | 49.7 |
| Appearance | | ○ | ○ | ○ | ○ | ○ | ○ | ○ | ○ | ○ | ○ | ○ |
| Abrasion Resistance | | Δ | ○ | ○ | Δ | ○ | ○ | ○ | ○ | Δ | Δ | Δ |
| Contact Angle (°) | | 139.5 | 142.2 | 145 | 143.8 | 145.4 | 145 | 144.4 | 131.2 | 114.1 | 141.4 | 136.5 |

TABLE 4

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Multifunctional Monomer (A) | ATM-4E | 60 | 90 | 65 | 90 | 80 | 90 | 87 | 84 | 60 | |
| | TMPT-6EO | | | | | | | | | | |
| Multifunctional Monomer Except for (A) | TAS | | | | | | | | | | 80 |
| Monomer (B) | FA1 | | | | | | | | | | |
| | FA2 | 40 | | 30 | 2.5 | 5 | 7 | 10 | 13 | 15 | 20 |
| | FA3 | | | | | | | | | | |
| Monomer (C) | FA4 | | 10 | | 7.5 | 15 | | | | | |
| | FA5 | | | 5 | | | 3 | 3 | 3 | 25 | |
| Monomer (D) | MA | | | | | | | | | | |
| Polymerization Initiator (E) | DAR1173 | 0.5 | 0.5 | 0.5 | 0.5 | 0.5 | 0.5 | 0.5 | 0.5 | 0.5 | 0.5 |
| | DAR TPO | 0.5 | 0.5 | 0.5 | 0.5 | 0.5 | 0.5 | 0.5 | 0.5 | 0.5 | 0.5 |
| (b × B + c × C)/(B + C) × 100 | | 49.7 | 49.7 | 51.2 | 51.7 | 51.7 | 52.8 | 52.1 | 51.6 | 56.1 | 49.7 |
| Appearance | | ○ | x | ○ | x | x | — | — | — | — | ○ |
| Abrasion Resistance | | x | x | x | x | x | — | — | — | — | Δ |
| Contact Angle (°) | | 141.6 | 139.8 | 145.1 | 142.2 | 143.2 | — | — | — | — | 129.0 |

The abbreviated codes in TABLE 3 and TABLE 4 (except for overlapping codes in TABLE 1 and TABLE 2) are as follows.

"MA": methyl acrylate

"DAR1173": 2-hydroxy-2-methyl-1-phenylpropane-1-one (made by Nihon Ciba-Geigy, trade name: DAROCURE 1173)

"DAR TPO": 2,4,6-trimethylbenzoyl-diphenyl-phosphine oxide (made by Nihon Ciba-Geigy, trade name: DAROCURE TPO)

As is clear from the results of TABLE 3 and TABLE 4, the nano concave-convex structure bodies obtained by curing the resin compositions of Examples 1 to 22 had a good appearance, a high abrasion resistance and a good water-repellent.

Example 23

A stamper suitable for developing water-repellent performance was produced and a nano concave-convex structure body was obtained using the resin composition used in above-mentioned Example 7. The stamper was obtained by the same operations except that the pore size was enlarged in which the time for enlarging the pore size of (d) step in the above-mentioned <Production of the stamper> was set to be 9.5 minutes in the first to fourth immersion and 2 minutes in only the final fifth immersion.

When the nano concave-convex structure body was transcribed using the stamper obtained in this way, the contact angle came to be over 150°.

INDUSTRIAL APPLICABILITY

Since the nano concave-convex structure body obtained by curing the activation energy ray-curable resin composition of the present invention has both a high abrasion resistance and a good water-repellent with keeping an excellent optical performance as a nano concave-convex structure body, it is available and industrially extremely useful for, for example, building material purposes such as walls and roofs, and window materials, mirrors and the like of houses as well as automobiles, trains or ships. Also, it is available for the purpose such as displays in which antireflection performance is required.

REFERENCE SIGNS LIST 10 nano concave-convex structure body
11 substrate
12 layer (outer layer) consisting of cured material of activation energy ray-curable resin composition
13 convex portion
13a top of convex portion
14 concave portion
14a bottom of concave portion
W1 spacing between adjacent convex portions
d1 vertical distance from bottom of concave portion to top of convex portion

The invention claimed is:

1. An activation energy ray-curable resin composition comprising
70 to 95 parts by mass of a multifunctional monomer (A) which has a surface free energy of 37 mJ/m$^2$ or more when cured and
5 to 30 parts by mass of a fluorine (meth)acrylate (B) which is compatible with the multifunctional monomer (A) (a total content of all monomers in the composition shall be 100 parts by mass),
and further comprising 20 parts by mass or less of a fluorine (meth)acrylate (C) which is incompatible with the multifunctional monomer (A),
wherein the multifunctional monomer (A) has three or more radical polymerizable functional groups in the molecule, and a value of the molecular weight divided by the number of the radical polymerizable functional group (Molecular weight/Number of radical polymerizable functional group) is in 110 to 200, and
the fluorine (meth)acrylate (B) has one or more radical polymerizable functional groups in a molecule,
and wherein the following equation is satisfied:

$$[b \times \text{content of }(B) + c \times \text{content of }(C)]/[\text{content of }(B) + \text{content of }(C)] \leq 51.5\%$$

in which the fluorine content b is a value of a total mass of fluorine atom contained in the fluorine (meth)acrylate (B) divided by the molecular weight of fluorine (meth)acrylate (B), and the fluorine content c is a value of a total mass of fluorine atom contained in fluorine (meth)acrylate (C) divided by the molecular weight of fluorine (meth)acrylate (C).

2. The activation energy ray-curable resin composition according to claim 1, wherein the fluorine (meth)acrylate (B) is a compound having
- a fluorine atom-containing site selected from perfluoroalkyl chains and perfluoropolyether chains which have a carbon number of 4 or more,
- a (meth)acryloyl group that is a radical polymerizable functional group, and a segment which is introduced between the fluorine atom-containing site and the polymerizable functional group for compatibility with the multifunctional monomer (A).

3. The activation energy ray-curable resin composition according to claim 2, wherein the segment introduced for compatibility with the multifunctional monomer (A) comprises any one of an alkylene oxide unit, an alkyl unit and an urethane bond.

4. The activation energy ray-curable resin composition according to claim 1, wherein the multifunctional monomer (A), the fluorine (meth)acrylate (B) and the fluorine (meth)acrylate (C) are mixed in a ratio where these are not separated.

5. The activation energy ray-curable resin composition according to claim 1, comprising the fluorine (meth)acrylate (B) and fluorine (meth)acrylate (C) in a total amount of 10 parts by mass or more (the total content of all monomers in the composition shall be 100 parts by mass).

6. The activation energy ray-curable composition according to claim 1, comprising no solvent.

7. A coating material comprising the activation energy ray-curable resin composition according to claim 1.

8. A cured coating obtained by polymerizing and curing the coating material according to claim 7.

9. A raw material for imprint using the activation energy ray-curable resin composition according to claim 1.

10. A molded article obtained by polymerizing and curing the activation energy ray-curable resin composition according to claim 1.

11. A water-repellent article obtained by polymerizing and curing the activation energy ray-curable resin composition according to claim 1.

12. A nano concave-convex structure body having a nano concave-convex structure concave-convex surface obtained by polymerizing and curing the activation energy ray-curable resin composition according to claim 1.

13. A water-repellent article having the nano concave-convex structure body according to claim 12.

14. A method for producing a nano concave-convex structure body comprising: providing the activation energy ray-curable resin composition according to claim 1 between a stamper and a substrate which have an inversion structure of a nano concave-convex structure, curing the activation energy ray-curable resin composition by irradiation of an activation energy ray, and detaching the stamper from the cured material to form a nano concave-convex structure consisting of the cured material on the substrate.

* * * * *